(12) United States Patent
Knudsen et al.

(10) Patent No.: US 8,405,568 B2
(45) Date of Patent: Mar. 26, 2013

(54) WIRELESS COMMUNICATION DEVICE ANTENNA WITH TUNING ELEMENTS

(75) Inventors: Mikael Bergholz Knudsen, Gistrup (DK); Bernd Adler, Neubiberg (DE); Peter Bundgaard, Aalborg (DK); Jan-Erik Mueller, Ottobrunn (DE); Gert F Pedersen, Storvorde (DK); Mauro Pelosi, Picinisco (IT)

(73) Assignee: Intel Mobile Communications GmbH, Neubiberg (DE)

( * ) Notice: Subject to any disclaimer, the term of this patent is extended or adjusted under 35 U.S.C. 154(b) by 840 days.

(21) Appl. No.: 12/475,379

(22) Filed: May 29, 2009

(65) Prior Publication Data

US 2010/0302123 A1   Dec. 2, 2010

(51) Int. Cl.
*H01Q 1/50* (2006.01)
(52) U.S. Cl. .................................... 343/861
(58) Field of Classification Search ............... 343/861, 343/702, 700 MS, 850, 860; 455/283, 284
See application file for complete search history.

(56) References Cited

U.S. PATENT DOCUMENTS

| | | | | |
|---|---|---|---|---|
| 5,969,681 A * | 10/1999 | O'Neill, Jr. | ............ | 343/700 MS |
| 6,920,315 B1 * | 7/2005 | Wilcox et al. | ............ | 455/121 |
| 7,369,092 B1 * | 5/2008 | Wen et al. | ............ | 343/702 |
| 7,801,565 B2 * | 9/2010 | Hovers et al. | ............ | 455/562.1 |
| 7,826,854 B2 * | 11/2010 | Hovers et al. | ............ | 455/452.2 |
| 2007/0180892 A1 * | 8/2007 | Sunshine | ............ | 73/24.01 |
| 2010/0013730 A1 * | 1/2010 | Azhari | ............ | 343/848 |
| 2010/0166098 A1 * | 7/2010 | Luz et al. | ............ | 375/267 |
| 2010/0279727 A1 * | 11/2010 | Lin | ............ | 455/517 |

OTHER PUBLICATIONS

Chebihi, Anissa et al., "A Novel Isolation Technique for Closely Spaced PIFAs for UMTS Mobile Phones", IEEE Antennas and Wireless Propagation Letters, vol. 7, 2008, pp. 665-668.
Diallo, C. Luxey, P. Le Thuc, R. Staraj, G. Kossiavas, "Enhanced Diversity Antennas for UMTS Handsets", IWAT, Cambridge, Mar. 21-23, 2007.
Pelosi, M. et al., "A Grip Study for Talk and Data Modes in Mobile Phones", IEEE Transactions on Antennas and Propagation, vol. 57, No. 4, Apr. 2009, pp. 856-865.
Pelosi, M. et al., "Influence of dielectric loading on PIFA antennas in close proximity to user's body", Electonic Letters, Feb. 26, 2009, vol. 45, No. 5, 2 pages.
Pelosi, M. et al., "User's Impact on PIFA Antennas in Mobile Phones", 4 Pages.
Pelosi, Mauro; Ondrej, Franek; Pedersen, Gert F.; Knudsen, Mikael, "User's Impact on PIFA Antennas in Mobile Phones," Vehicular Technology Conference, 2009. VTC Spring 2009. IEEE 69th , vol., no., pp. 1-5, Apr. 26-29.

* cited by examiner

*Primary Examiner* — Huedung Mancuso
(74) *Attorney, Agent, or Firm* — SpryIP, LLC

(57) ABSTRACT

The present disclosure relates to wireless communication device antennas with tuning elements.

19 Claims, 9 Drawing Sheets ns with tuning elements may be decoupled from the chassis of the wireless communication device. Decoupling the antenna from the chassis provides greater flexibility in wireless communication device design. For example, a small narrowband antenna with tuning elements can become a standard component that is utilized across a number of wireless communication device
WIRELESS COMMUNICATION DEVICE ANTENNA WITH TUNING ELEMENTS

BACKGROUND

Wireless communication devices may include multiple transceivers with each transceiver providing communications via a different wireless communication technology. For example, a wireless communication device may include a tri-band universal mobile telecommunications system (UMTS) transceiver, a quad-band global system for mobile communications (GSM) transceiver, a wireless local area network (WLAN) transceiver, a global positioning system (GPS) transceiver, a digital video broadcasting-handheld (DVB-H) transceiver, or a combination thereof.

The size of an antenna of a particular wireless communication device is based on the frequency range of signals transmitted and/or received by the transceiver(s) coupled to the antenna. Additionally, the efficiency of an antenna depends on the size of the antenna. In some instances, the size of the antenna may be based on a tradeoff between the efficiency of the antenna and the frequency range of signals transmitted and/or received.

In some implementations, wireless communication devices may include a single large antenna in order to meet the bandwidth and efficiency requirements of the transceivers of the wireless communication device. In other implementations, a separate antenna is coupled to each transceiver, which increases overall antenna volume of the wireless communication device. Further, the efficiency of an antenna can decrease due to absorption loss based on interactions between a user and the wireless communication device, such as the way that the user is holding the wireless communication device.

The design of wireless communication devices can be limited due to volume occupied by multiple antennas or by large antennas. For example, a high antenna volume can limit the components or types of components included in a wireless communication device, such as a display, a camera, memory cards, etc. In addition, since the antenna of a wireless communication device is often connected to the chassis, the design of wireless communication devices is not easily modified, as any modification affects the performance of the antenna. Absorption loss can also increase when the antenna is connected to the chassis, which further affects the performance of the antenna.

BRIEF DESCRIPTION OF THE DRAWINGS

The detailed description is described with reference to the accompanying figures. In the figures, the left most digit(s) of a reference number identifies the figure in which the reference number first appears. The use of the same reference numbers in different figures indicates similar or identical items.

DETAILED DESCRIPTION

The disclosure is directed to providing impedance tuning of antennas including a number of tuning elements. In one implementation, a wireless communication device includes a transceiver and a small narrowband antenna. The small narrowband antenna includes one or more tuning elements to match an impedance of a receiving amplifier or a transmitting amplifier with an impedance of the narrowband antenna by changing a resonance frequency of the small narrowband antenna. The total antenna volume of a wireless communication device can be reduced by utilizing a small narrowband antenna with tuning elements. For example, a wireless communication device can include multiple small antennas rather than one large antenna. In this way, absorption loss may decrease because a user of the wireless communication device may have less contact with at least one of the small antennas. Additionally, small narrowband antennas with tuning elements may be decoupled from the chassis of the wireless communication device. Decoupling the antenna from the chassis provides greater flexibility in wireless communication device design. For example, a small narrowband antenna with tuning elements can become a standard component that is utilized across a number of wireless communication device models, rather than a new antenna being required each time the design of a wireless communication device changes. Additionally, for wireless communication devices include a number of antennas for multiple receivers, the total antenna volume may be reduced.

Figure 1:
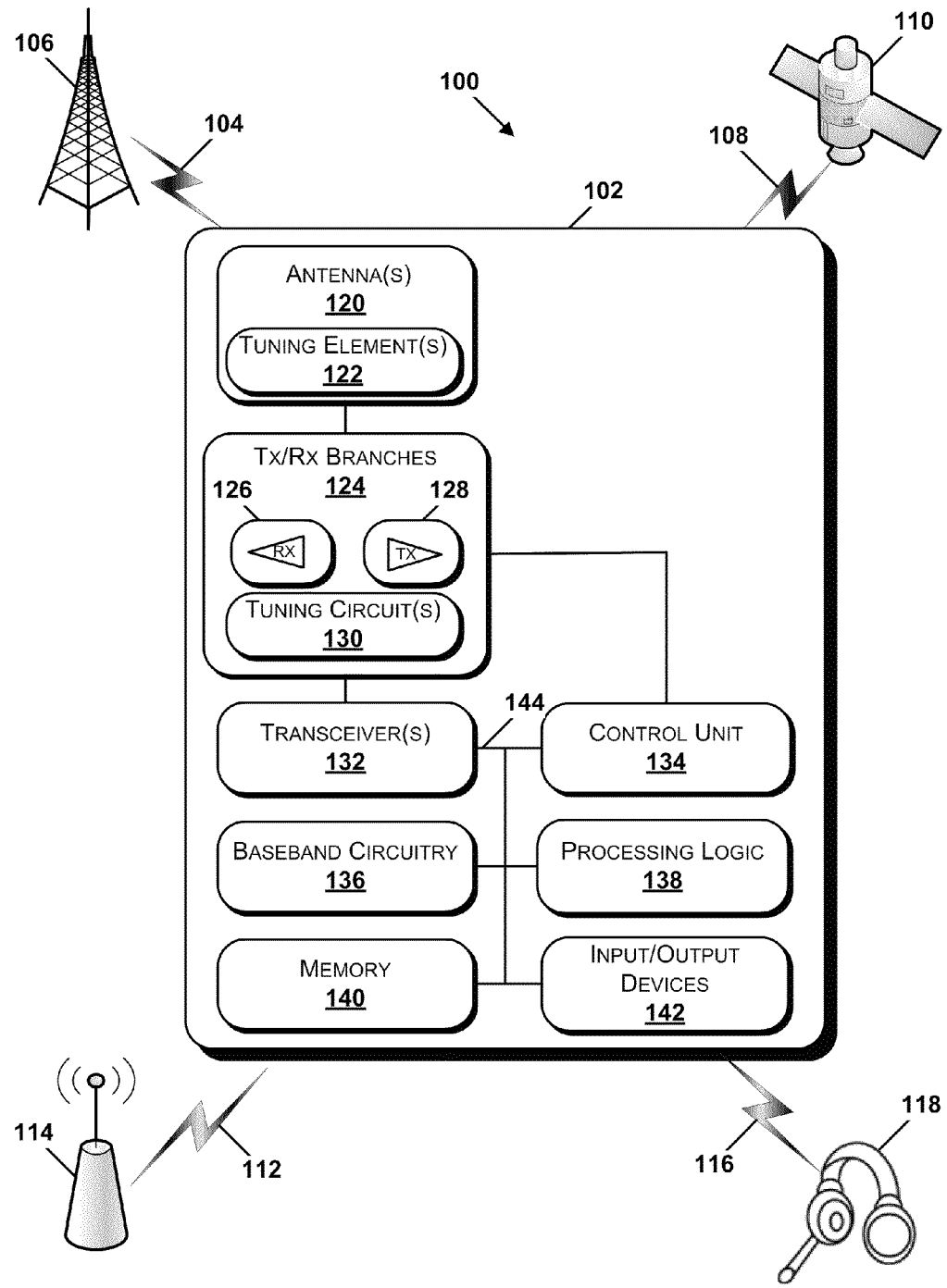
FIG. 1 shows an exemplary system utilizing an antenna with tuning elements.

FIG. 1 shows an exemplary system utilizing an antenna with tuning elements. The system 100 includes a wireless communication device 102 that is configured to transmit wireless signals to, and receive wireless signals from one or more external devices. The wireless signals may include voice traffic, data, control information, or any combination thereof. The wireless communication device 102 may be implemented in any number of ways, including as a smart phone, a hand-held computing device (e.g., a personal digital assistant (PDA)), a mobile telephone, a media playing device, a portable gaming device, a personal computer, a laptop computer, another suitable wireless communication device, or any combination thereof.

In one implementation, the wireless communication device 102 may transmit and/or receive wireless signals 104 via a base station 106. The base station 106 may be included in a wide area wireless communication network, such as a GSM network, a UMTS network, a code division multiple access (CDMA) network, a high speed packet access (HSPA) network, a general packet radio service (GPRS) network, an enhanced data rates for GSM evolution (EDGE) network, a worldwide interoperability for microwave access (WiMAX)

network, a time division multiple access (TDMA) network, a frequency division multiple access (FDMA) network, a long term evolution (LTE) network, an LTE-A network, or any combination thereof.

In another implementation, the wireless communication device 102 may transmit and/or receive wireless signals 108 via a communication satellite 110. Further, the wireless communication device 102 may transmit and/or receive wireless signals 112 via a wireless access point 114. The wireless access point 114 may be included in a wide area wireless network or a wireless local area network, such as a Bluetooth network or an Institute of Electrical and Electronics Engineers (IEEE) 802.11 protocol network. Additionally, the wireless communication device 102 may transmit and/or receive wireless signals 116 via a headset 118, such as a Bluetooth headset.

In a particular implementation, the wireless communication device 102 includes one or more antennas 120. The antenna(s) 120 may be placed in various locations of the wireless communication device 102, such as a bottom portion or a top portion of the wireless communication device 102. In some implementations, the antenna(s) 120 may be very small, such as a microstrip antenna. For example, the antenna(s) 120 may include a planar inverted F antenna (PIFA) or a folded inverted conformal antenna (FICA). The size of the antenna(s) 120 may be reduced by coupling each of the antenna(s) 120 to a high permittivity dielectric substrate. Further, the size of the antenna(s) 120 may also be reduced by increasing the quality factor (Q) of the antenna(s) 120. For example, the quality factor of the antenna(s) 120 may be increased by lowering the building height of the antenna(s) 120. In another example, the quality factor of the antenna(s) 120 may be increased by adding ceramic materials to the antenna(s) 120.

Additionally, the antenna(s) 120 may cover a narrow band of frequencies at a given time. In particular, the band of frequencies covered by the antenna(s) 120 during a communication session may be less than the entire range of frequencies covered by signals transmitted and received according to a particular wireless communication technology. For example, the wireless communication device 102 may be configured to transmit signals according to the UMTS wireless communication technology in a range of 1920-1980 MHz. However, at any given time, the antenna(s) 120 may transmit signals within one or more channels having a range of 3.84 MHz each.

The frequency of signals received and transmitted by the antenna(s) 120 depends on a particular resonant frequency of the antenna(s) 120. In some implementations, the antenna(s) 120 are multi-band antennas that are tuned to different resonant frequencies. For example, a particular one of the antenna(s) 120 may be tuned to a first resonant frequency while receiving signals of a particular wireless communication technology and the particular antenna may be tuned to a second resonant frequency while transmitting signals of the particular wireless communication technology. Additionally, a particular one of the antenna(s) 120 may be tuned to resonant frequencies to send and receive signals via a first wireless communication technology during a first communication session, while during a second communication session the particular antenna is tuned to a different resonant frequencies to send and receive signals via a second wireless communication technology.

The antenna(s) 120 includes one or more tuning elements 122 to alter the resonance frequency of the antenna(s) 120 by changing the electrical structure of the antenna(s) 120. In a particular example, the tuning elements 122 may be coupled directly to radiating elements of the antenna(s) 120. In another example, the tuning elements 122 may be placed in signal carrying paths coupled to the antenna(s) 120. Additionally, the tuning elements 122 may be coupled between two or more of the antenna(s) 120. In one implementation, the tuning elements 122 include radio frequency (RF) based switches coupled to one or more capacitors, one or more inductors, or a combination thereof. In another implementation, the tuning elements 122 include tunable capacitors, such as microelectromechanical system (MEMS) capacitors.

In addition, the wireless communication device 102 includes one or more transmitting and receiving (Tx/Rx) branches 124 coupled to the antenna(s) 120. The Tx/Rx branches 124 may include a number of components to process signals transmitted and received by the antenna(s) 120. For example, a receiving branch of the Tx/Rx branches 124 may include a receiving amplifier 126 and a transmitting branch of the Tx/Rx branches 124 may include a transmitting amplifier 128. The receiving amplifier 126 may be a low noise amplifier and the transmitting amplifier 128 may be a power amplifier. The Tx/Rx branches 124 may also include a number of additional components, such as one or more switches, one or more filters, such as duplex filters and high pass filters, or a combination thereof. In addition, each transmitting branch of the Tx/Rx branches 124 may include one or more additional power amplifiers. Further, each receiving branch of the Tx/Rx branches 124 may include one or more additional low noise amplifiers.

Further, the Tx/Rx branches 124 may include one or more tuning circuits 130. The one or more tuning circuits 126 may match an impedance of the antenna(s) 120 with an impedance of the receiving amplifier 126 and/or the transmitting amplifier 128. The impedance matching performed by the tuning circuits 130 may be in addition to the impedance tuning achieved via the tuning elements 122. The wireless communication device 102 also includes one or more transceiver(s) 132 that are configured to process signals to be transmitted and to process signals received via one or more respective wireless communication technologies. In some implementations, the receiving amplifier 126 and the transmitting amplifier 128 may be included in the transceivers 132 rather than the Tx/Rx branches 124.

In an illustrative implementation, each of the antenna(s) 120 is coupled to a respective transmitting branch, a respective receiving branch, or a combination thereof. For example, a particular one of the antenna(s) 120 may be coupled to a transmitting branch to transmit signals from a particular one of the transceiver(s) 132 to the external devices 106, 110, 114, 118. In another example, the particular antenna 120 may be coupled to a receiving branch to communicate signals received at the particular antenna 120 from the external devices 106, 110, 114, 118 to the particular transceiver 132. Further, the particular antenna 120 may be coupled to a combined branch to both communicate signals both to and from the particular transceiver 132.

In some implementations, the impedance of the receiving amplifier 126 and the transmitting amplifier 128 may be relatively stable. For example, the impedance of the receiving amplifier 126 and/or the transmitting amplifier 128 may be approximately 50 ohms. The impedance of the antenna(s) 120 may depend on signals received via the antenna(s) 120, signals to be transmitted via the antenna(s) 120, interaction between a user of the wireless communication device 102 and the antenna(s) 120 (e.g. a hand of a user covering a portion of the narrowband antenna 120), interaction of additional objects located proximate to the antenna(s) 120, or a combination thereof. Matching the impedance of the narrowband antenna 120 with the impedance of the receiving amplifier 126 and the transmitting amplifier 128 provides efficient transmission and reception of signals via the antenna(s) 120 by reducing an amount of energy reflected back from components of the wireless communication device 102 providing the signal (i.e. the antenna(s) 120 or the transceiver(s) 128). The impedance of the antenna(s) 120 with respect to the receiving amplifier 126 and the transmitting amplifier 128 and the impedance of the amplifiers 126, 128 with respect to the antenna(s) 120 may be influenced by additional components of the Tx/Rx branches 124, such as one or more signal carrying lines, one or more switches, one or more duplex filters, one or more power amplifiers, one or more low noise amplifiers, or a combination thereof.

In an illustrative implementation, when signals are transmitted from a particular one of the transceiver(s) 128 to a particular one of the antenna(s) 120, the tuning circuits 130, the tuning element(s) 122, or a combination thereof, match the impedance of the transmitting amplifier 128 with the impedance of the particular antenna 120, such that the impedance of particular antenna 120 with respect to the impedance of the transmitting amplifier 128 is approximately the same. For example, when the impedance of a particular one of the transmitting amplifier 128 is 50 ohms and the impedance of a particular antenna of the antenna(s) 120 is 65 ohms, one or more of the tuning circuits 130 alone or in combination with the tuning elements 122, modify the impedance of the particular antenna 120 with respect to the transmitting amplifier 128, such that the particular antenna 120 appears to have an impedance of 50 ohms with respect to the transmitting amplifier 128. In another illustrative implementation, when signals are received at a particular one of the antenna(s) 120 from an external device and sent to a particular one of the transceivers 128 for processing, one or more tuning circuits 130, alone or in combination with the tuning elements 122, match the impedance of the receiving amplifier 126 with the impedance of the particular antenna 120, such that the impedance of the receiving amplifier 126 with respect to the particular antenna 120 is approximately the same.

In some instances a mismatch between the impedance of the antenna(s) 120 and the impedance of the receiving amplifier 126 or the transmitting amplifier 128 is due to transmitting or receiving a signal that is outside the resonant frequency of the antenna(s) 120. For example, when one of the antenna(s) 120 switches from transmitting a signal via a particular wireless communication technology to receiving a signal via the particular wireless communication technology, the impedance of the antenna 120 may differ from the impedance of the receiving amplifier 128. In response to the impedance mismatch between the antenna 120 and the receiving amplifier 128, the tuning circuits 130, the tuning elements 122, or a combination thereof, match the impedance of the antenna 120 to the impedance of the receiving amplifier 128. In this way, the impedance matching provided by the tuning circuits 130 and/or the tuning elements 122 allows the narrowband antenna 120 to efficiently send and receive signals across a range of frequencies.

Further, absorption loss may affect the impedance of the antenna(s) 120 with respect to the receiving amplifier 126 and the transmitting amplifier 128. For example, a user of the wireless communication device 102 may block one or more of the antenna(s) 120 by holding the wireless communication device 102 in a particular manner. When the impedance of the antenna(s) 120 changes due to absorption loss, the tuning elements 122, the tuning circuits 130, or a combination thereof, operate to match the impedance of the antenna(s) 120 with the impedance of the receiving amplifier 126 and/or the transmitting amplifier 128.

The wireless communication device 102 includes a control unit 134. The control unit 134 provides control signals to the tuning elements 122, the tuning circuits 130, or a combination thereof, to match the impedance of the antenna(s) 120 with the impedance of the receiving amplifier 126, the impedance of the transmitting amplifier 128, or both. For example, the control unit 134 may provide control signals to the tuning elements 122 and/or the tuning circuits 130 to change a state of one or more MEMS capacitors. In another example, the control unit 134 may provide control signals to switches of the tuning elements 122 and/or the tuning circuits 130. The control unit 134 may also receive signals from the one or more transceivers 132 indicating a frequency range of signals sent and received via the antenna(s) 120. In this way, the control unit 134 can determine an impedance of the antenna(s) 120 based on signals transmitted or received at a given time and provide control signals to the tuning elements 122 and/or the tuning circuits 130 to match the impedance of the antenna(s) 120 with the impedance of the receiving amplifier 126 and/or the transmitting amplifier 128.

The control unit 134 may receive a number of inputs from baseband circuitry 136, as well as other sources, that are used when providing control signals to the tuning elements 122 and/or the tuning circuits 130. For example, the baseband circuitry 136 may provide a lowest possible bit error rate to the control unit 134. In another example, the baseband circuitry 136 may provide to the control unit 134, a power control level of a network communicating signals with the wireless communication device 102 in order to minimize the power control level feedback from the network. The baseband circuitry 136 may also provide the forward power at the antenna(s) 120 for signals transmitted to external devices and also the reflected power at the antenna(s) 120. Further, the baseband circuitry 162 may provide a use case, such as gaming, talk, handset, to the control unit 134 indicating possible influence of user interaction with the wireless communication device 102. Data from sensors indicating user interaction with certain parts of the wireless communication device 102 may also be provided to the control unit 134, as well as, current consumption. The control unit 134 may also receive a received signal strength indication (RSSI). The control unit 134 processes the inputs received from the baseband circuitry 136 and other sources to optimize the tuning of the impedances of the antenna(s) 120 and the receiving amplifier 126 and the transmitting amplifier 128.

The wireless communication device also includes additional components, such as processing logic 138 and memory 140. The processing logic 138 may include one or more processors and the memory 140 may be is accessible to the processing logic 138. The memory 140 may include read-only memory (ROM), random access memory (RAM), flash memory, a hard disk, or any combination thereof. Additionally, the memory 140 may store one or more applications configured to transmit and/or receive wireless signals. For example, the memory 140 may store an application configured to send and receive wireless signals related to telephone calls, such as voice traffic or control information. In another example, the memory 140 may store an application configured to request and receive website data, an application configured to transmit and receive text messages, an application configured to transmit and receive picture messages, an application configured to transmit and receive video messages, or any combination thereof. The applications stored in the memory 140 may include software instructions, hardware, or any combination thereof.

The wireless communication device 102 also includes one or more input/output devices 142. In an illustrative embodiment, the input/output devices 142 may include a microphone, a speaker, a touchpad display, a cursor control device, such as a mouse, a keypad, or any combination thereof. Additionally, the wireless communication device 102 includes a bus 144 to facilitate the communication of signals between components of the wireless communication device 102 and other components not shown, such as a power supply.

Figure 2:
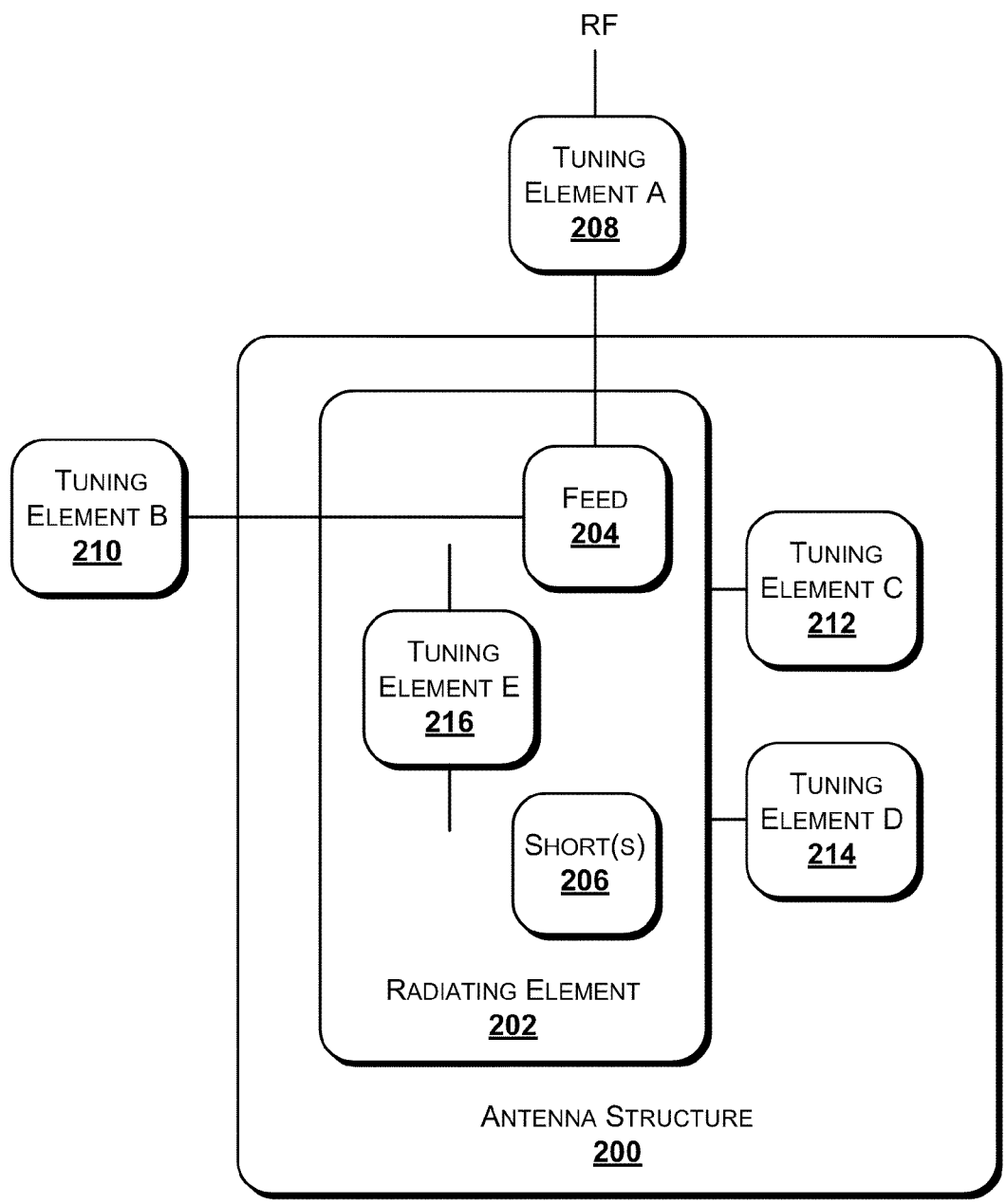
FIG. 2 shows a schematic diagram of an antenna structure with one feed point and a number of tuning elements.

FIG. 2 shows a diagram of an antenna structure 200 with one feed point and a number of tuning elements. The antenna structure 200 may be included in a wireless communication device, such as the wireless communication device 102 of FIG. 1. Additionally, the antenna structure 200 may be decoupled from the chassis of the wireless communication device. In this way, the antenna structure 200 can serve as a standard component of the wireless communication device, such that the antenna structure 200 can be utilized in multiple wireless communication device designs. In some implementations, the antenna structure 200 may be included in the antenna(s) 120 of FIG. 1. Further, the antenna structure 200 may be very small. For example, the antenna structure 200 may be a PIFA coupled to a high permittivity substrate. In addition, the antenna structure 200 may have a high quality factor (Q).

The radiating element 202 may transmit and receive signals via one or more frequency ranges of one or more wireless communication technologies. Additionally, the radiating element 202 may include a feed 204. The feed 204 may be coupled to one or more transmitting branches, one or more receiving branches, or a combination thereof, such that the radiating element 202 can transmit and receive signals, RF, via different wireless communication technologies operating in different frequency ranges and/or via different bands of a particular wireless communication technology. In one implementation, the feed 204 is coupled to a transmitting amplifier of a transmitting branch, such that the antenna structure 200 can transmit signals from a transceiver via the feed 204. In another implementation, the feed 204 is coupled to a receiving amplifier of a receiving branch, such that the antenna structure 200 can provide signals to device transceiver via a respective feed line. In still other implementations, signals may be transmitted and received via the feed 204. The radiating element 202 also includes one or more shorts 206 that provide a connection between the radiating element 202 and ground. The one or more shorts 206 may provide some impedance tuning between the antenna structure 200 and a transmitting amplifier, a receiving amplifier, or a combination thereof.

The antenna structure 200 also includes a number of tuning elements. The tuning elements may be coupled to the antenna structure 200 via a signal carrying line, such as the tuning circuits 130 of FIG. 1, or the tuning elements may be directly coupled to the radiating element 202, such as the tuning elements 122 of FIG. 1. In an illustrative implementation, the tuning element A 208 is coupled to the feed 204 and in series with a line carrying the signal RF. In another illustrative implementation, the tuning element B 210 is coupled to the feed 204 and in parallel with a line carrying the signal RF. Additionally, the tuning element C 212 and the tuning element D 214 are coupled directly to the radiating element 202. In some implementations, tuning element C 212 and the tuning element D 214 may be coupled to particular locations on the radiating element 202 to optimize the impedance matching performed by the respective tuning elements and to minimize any interference that the tuning elements 212, 214 may produce. Further, the antenna structure 200 includes a tuning element E 216 coupled between two points on the radiating element. The tuning elements 208-216 alter the resonance frequency of the antenna structure 200 by changing the electrical structure of the antenna structure 200. In this way, a single antenna can be used to send and receive signals via a number of different frequency ranges while minimizing mismatch loss and while minimizing absorption loss.

The requirements of the tuning elements 208-216 may differ depending on the application of a particular tuning element. For example, in some instances when performing impedance matching due to absorption loss, a tuning element may have a slow reaction time in response to receiving a control signal. In another example, in some instances when performing impedance matching due to mismatch loss caused by changing from transmitting/receiving signals via a particular frequency to transmitting/receiving signals via another frequency, a particular tuning element may need to react quickly to an applied control signal. Additionally, tuning elements placed in a receiving branch may have different requirements from tuning elements placed in a transmitting branch.

In some implementation, the tuning elements 208-216 include one or more switches. For example, the tuning elements 208-216 may include radio frequency (RF) switches. The RF switches may include ohmic and/or capacitive RF MEMS switches, PIN diodes, field effect and/or bipolar based transistor switches, or a combination thereof. In another example, the tuning elements 208-216 may include mechanical switches. The switches are coupled to one or more capacitors and/or one or more inductors, such as a capacitor bank, an inductor bank or a combination thereof. In a particular implementation, the capacitors can be thin film capacitors manufactured in a semiconductor process, a microelectromechanical (MEMS) process, or a combination thereof. In addition, the thin film capacitors can be manufactured in an enhanced package process or a module manufacturing process based on laminate or ceramic material. The capacitors can also be discrete surface mount devices or a combination of discrete surface mount devices and thin film capacitors. By utilizing switches in conjunction with a capacitor bank and/or inductor bank, element values in the bank can be used for impedance tuning in discrete steps. For example, when four capacitive or inductive elements are available in the bank, four bit control is possible. The tuning elements 208-216 may also be tunable capacitor based with the capacitor values controlled by analog voltage. For example, the tuning elements 208-216 may be semiconductor devices, such as varactors and diodes, dielectric based material, or MEMS capacitors.

In an illustrative implementation, switches of the tuning elements 208-216 may be activated in response to receiving a control signal from a control unit in order to open or close. By opening or closing the switches, the state of inductors and/or capacitors coupled to the switches may change. In this way, the impedance of the antenna structure 200 with respect to a transmitting amplifier or a receiving amplifier may change in order to match the impedance of the antenna structure 200 with the impedance of the transmitting amplifier or the receiving amplifier. In another illustrative implementation, tunable capacitors of the tuning elements 208-216 may discharge or store current in response to control signals applied by a control unit. By changing the current stored or discharged by the tunable capacitors, the state of the tunable capacitors changes and the impedance of the antenna structure 200 is modified accordingly.

Figure 3:
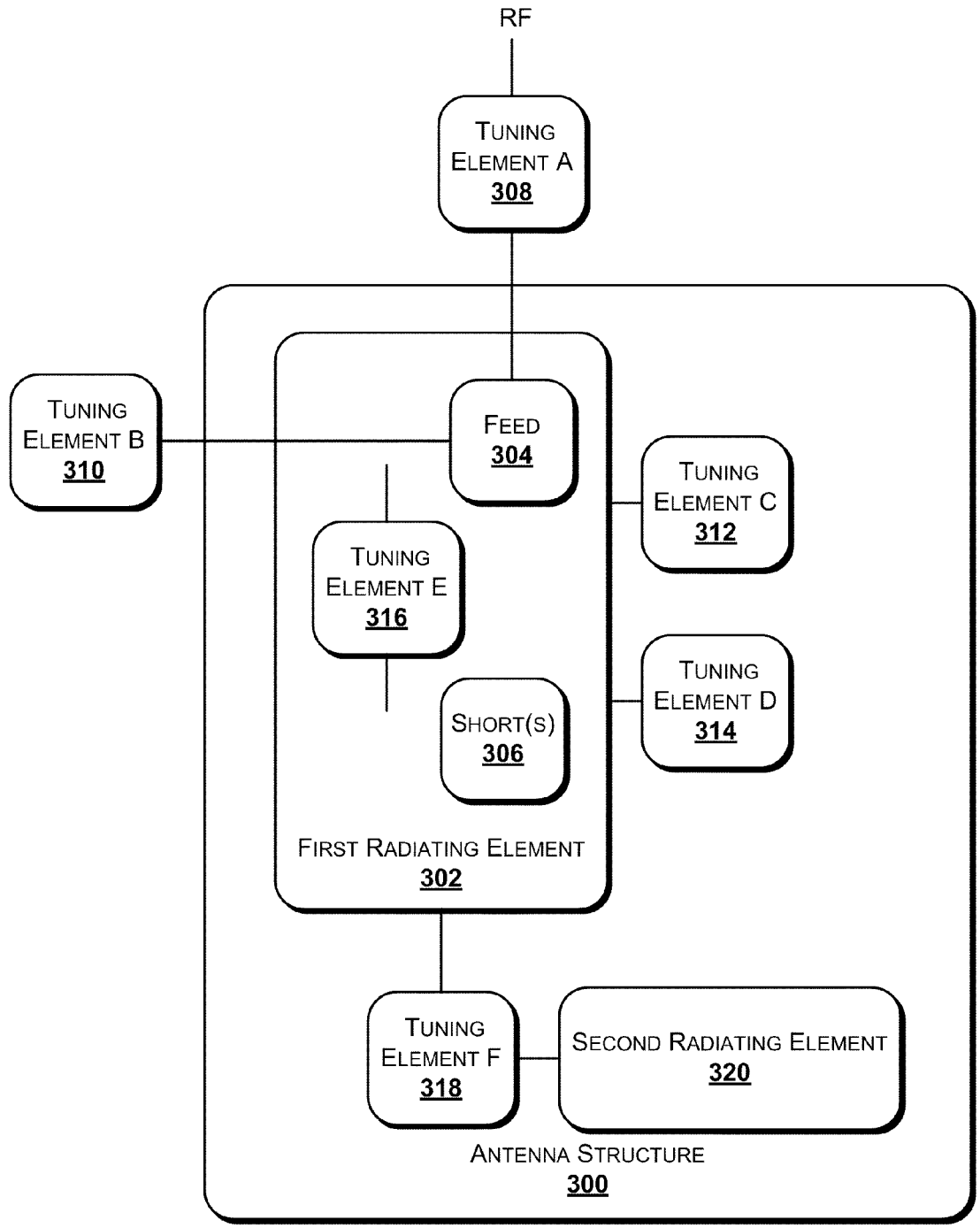
FIG. 3 shows a schematic diagram of an antenna structure with multiple radiating elements and a number of tuning elements.

FIG. 3 shows a schematic diagram of an antenna structure with multiple radiating elements and a number of tuning elements. The antenna structure 300 may be included in a wireless communication device, such as the wireless communication device 102 of FIG. 1. Additionally, the antenna structure 300 may be decoupled from the chassis of the wireless communication device. In this way, the antenna structure 300 can serve as a standard component of the wireless communication device, such that the antenna structure 300 can be utilized in multiple wireless communication device designs. In some implementations, the antenna structure 300 may be included in the antenna(s) 120 of FIG. 1.

The first radiating element 302 may transmit and receive signals via one or more frequency ranges of one or more wireless communication technologies. Additionally, the first radiating element 302 may include a feed 304. The feed 304 may be coupled to one or more transmitting branches, one or more receiving branches, or a combination thereof, such that the first radiating element 302 can transmit and receive signals, RF, via different wireless communication technologies operating in different frequency ranges and/or via different bands of a particular wireless communication technology. In one implementation, the feed 304 is coupled to a transmitting amplifier of a transmitting branch, such that the antenna structure 300 can transmit signals via the feed 304. In another implementation, the feed 304 is coupled to a receiving amplifier of a receiving branch, such that the antenna structure 300 can provide signals to the receiver device via a respective feed line. In still other implementations, signals may be transmitted and received via the feed 304. The first radiating element 302 also includes one or more shorts 306 that provide a connection between the radiating element 302 and ground. The one or more shorts 306 may provide some impedance tuning between the antenna structure 300 and a transmitting amplifier and/or a receiving amplifier.

The antenna structure 300 also includes a number of tuning elements. The tuning elements may be coupled to the antenna structure 300 via a signal carrying line, such as the tuning circuits 130 of FIG. 1, or the tuning elements may be directly coupled to the first radiating element 302, such as the tuning elements 122 of FIG. 1. In an illustrative implementation, the tuning element A 308 is coupled to the feed 304 and in series with a line carrying the signal RF. In another illustrative implementation, the tuning element B 310 is coupled to the feed 304 and in parallel with a line carrying the signal RF. Additionally, the tuning element C 312 and the tuning element D 314 are coupled directly to the radiating element 302. In some implementations, tuning elements C 312 and the tuning element D 314 may be coupled to particular locations on the first radiating element 302 to optimize the impedance matching performed by the respective tuning elements and to minimize any interference that the tuning elements 312, 314 may produce. Further, the antenna structure 300 includes a tuning element E 316 coupled between two points on the radiating element.

The antenna structure 300 also includes a tuning element F 318 coupled to the first radiating element 302 and a second radiating element 320. The second radiating element 320 may transmit and receive signals via one or more frequency ranges that are different from the frequency ranges transmitted and received by the first radiating element 302. Additionally, the second radiating element 320 may include one or more feeds and one or more shorts (not shown). The second radiating element 320 may also be directly coupled to one or more tuning elements. The antenna structure 300 may include a notch (not shown) in order to isolate the first radiating element 302 from the second radiating element 320.

Figure 4:
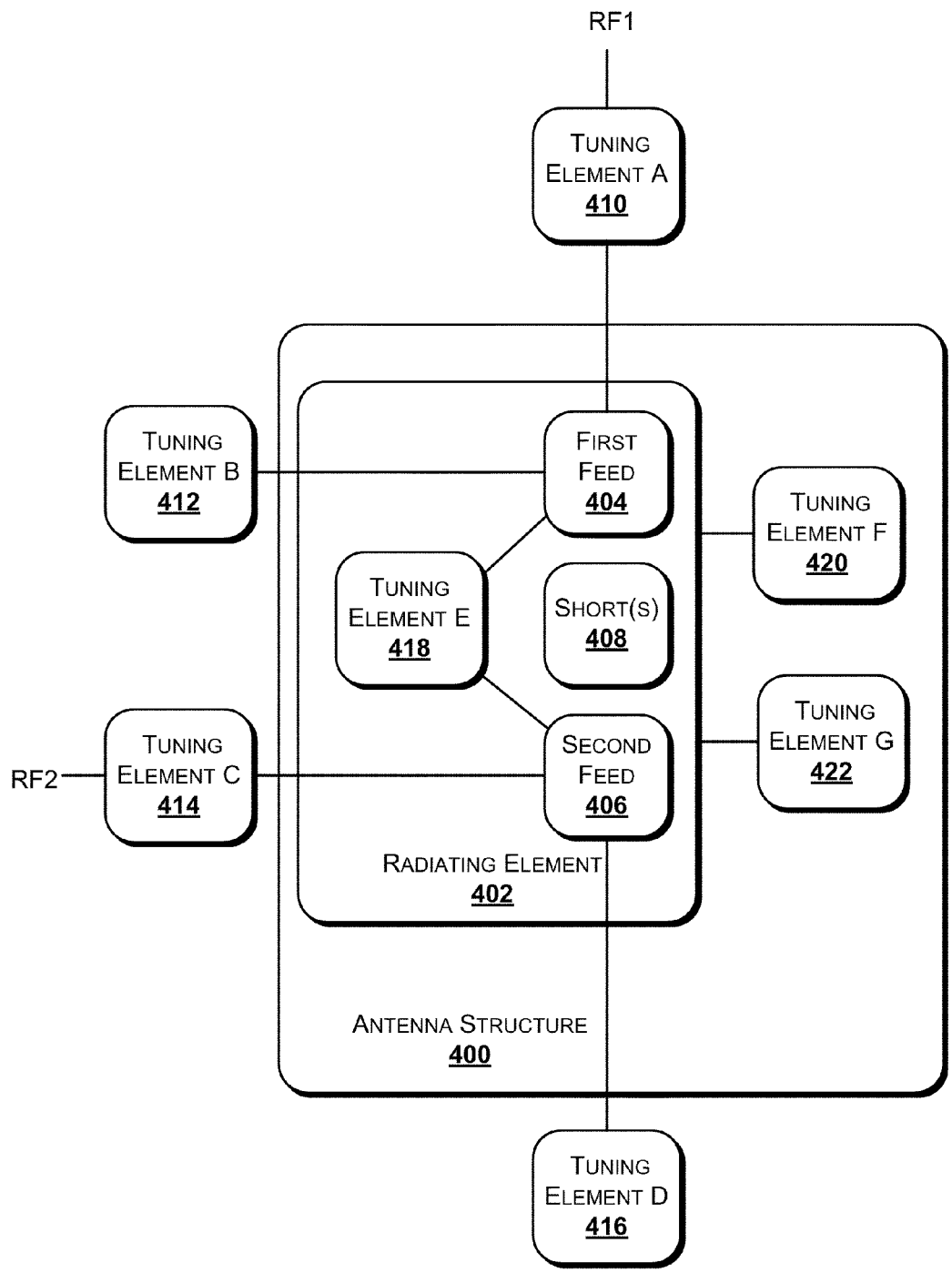
FIG. 4 shows a schematic diagram of an antenna structure with multiple feed points and a number of tuning elements.

FIG. 4 shows a schematic diagram of an antenna structure with multiple feed points and a number of tuning elements. The antenna structure 400 may be included in a wireless communication device, such as the wireless communication device 102 of FIG. 1. Additionally, the antenna structure 400 may be decoupled from the chassis of the wireless communication device. In this way, the antenna structure 400 can serve as a standard component of the wireless communication device, such that the antenna structure 400 can be utilized in multiple wireless communication device designs. In some implementations, the antenna structure 400 may be included in the antenna(s) 120 of FIG. 1.

The radiating element 402 may transmit and receive signals via one or more frequency ranges of one or more wireless communication technologies. Additionally, the radiating element 402 may include a first feed 404 and a second feed 406. The feeds 404-406 may be coupled to one or more transmitting branches, one or more receiving branches, or a combination thereof, such that the radiating element 402 can transmit and receive signals RF1 and RF2 via different wireless communication technologies operating in different frequency ranges and/or via different bands of a particular wireless communication technology. In one implementation, the first feed 404 is coupled to a transmitting amplifier of a transmitting branch and the second feed 406 is coupled to a receiving amplifier of a receiving branch, such that the antenna structure 400 can transmit or receive signals RF1 and RF2 via two different feed lines. Additionally, one or more of the feeds 404, 406 can be used to both transmit and receive signals. In some implementations, one of the feeds 404, 406 is used to transmit and receive signals, while the other feed only transmits or receives signals. The radiating element 402 also includes one or more shorts 408 that provide a connection between the radiating element 402 and ground. The one or more shorts 408 may provide some impedance tuning between the antenna structure 400 and a transmitting amplifier and/or a receiving amplifier.

The antenna structure 400 also includes a number of tuning elements. The tuning elements may be coupled to the antenna structure 400 via a signal carrying line, such as the tuning circuits 130 of FIG. 1, or the tuning elements may be directly coupled to the radiating element 402, such as the tuning elements 122 of FIG. 1. In an illustrative implementation, the tuning element A 410 is coupled to the first feed 404 and in series with a line carrying the signal RF. In another illustrative implementation, the tuning element B 412 is coupled to the first feed 404 and in parallel with a line carrying the signal RF. Further, the tuning element C 414 is coupled to the second feed 406 and in series with a line carrying the signal RF2 and the tuning element D 416 is coupled to the second feed 406 and in parallel with a line carrying the signal RF2. The tuning element E 418 is coupled to both the first feed 404 and the second feed 406. Additionally, the tuning element F 420 and the tuning element G 422 are coupled directly to the radiating element 402. In some implementations, the tuning element F 420 and the tuning element G 422 may be coupled to particular locations on the radiating element 402 to optimize the impedance matching performed by the respective tuning elements and to minimize any interference that the tuning elements 420, 422 may produce.

Figure 5:
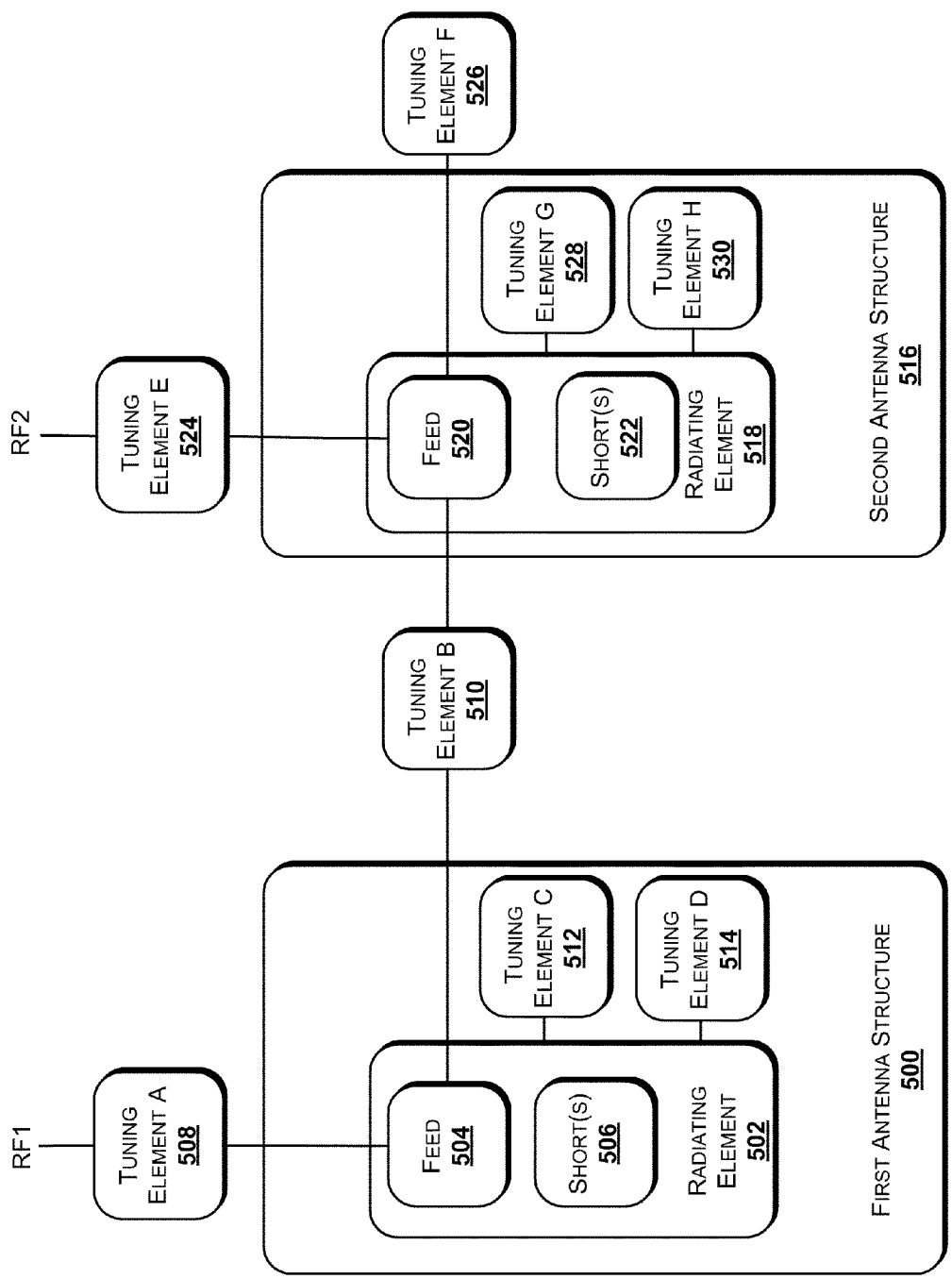
FIG. 5 shows a schematic diagram of multiple antenna structures including one feed point and a number of tuning elements.

FIG. 5 shows a schematic diagram of multiple antenna structures including one feed point and a number of tuning elements. The antenna structures may be included in a wireless communication device, such as the wireless communication device 102 of FIG. 1. Additionally, the antenna structures may be decoupled from the chassis of the wireless communication device. In this way, the antenna structures can serve as a standard component of the wireless communication device, such that the antenna structures can be utilized in multiple wireless communication device designs.

The first antenna structure 500 includes a radiating element 502 that may transmit and receive signals via one or more frequency ranges of one or more wireless communication technologies. Additionally, the radiating element 502 may include a feed 504. The feed 504 may be coupled to one or more transmitting branches, one or more receiving branches, or a combination thereof, such that the radiating element 502 can transmit and receive signals RF1 via different wireless communication technologies operating in different frequency ranges and/or via different bands of a particular wireless communication technology. In one implementation, the feed 504 is coupled to a transmitting amplifier of a transmitting branch and in another implementation, the feed 504 is coupled to a receiving amplifier of a receiving branch, such that the first antenna structure 500 can transmit or receive signals via a respective feed line. Additionally, signals may be transmitted and received via the feed 504. The radiating element 502 also includes one or more shorts 506 that provide a connection between the radiating element 502 and ground. The one or more shorts 506 may provide some impedance tuning between the first antenna structure 500 and a transmitting amplifier and/or a receiving amplifier.

The first antenna structure 500 also includes a number of tuning elements. The tuning elements may be coupled to the first antenna structure 500 via a signal carrying line or the tuning elements may be directly coupled to the radiating element 502. In an illustrative implementation, the tuning element A 508 is coupled to the feed 504 and in series with a line carrying the signal RF1. In another illustrative implementation, the tuning element B 510 is coupled to the feed 504 and in parallel with a line carrying the signal RF1. Additionally, the tuning element C 512 and the tuning element D 514 are coupled directly to the radiating element 502. In some implementations, tuning element C 512 and the tuning element D 514 may be coupled to particular locations on the radiating element 502 to optimize the impedance matching performed by the respective tuning elements and to minimize any interference that the tuning elements 512, 514 may produce.

A second antenna structure 516 includes a radiating element 518 that may transmit and receive signals via one or more wireless communication technologies. Additionally, the radiating element 518 may include a feed 520. The feed 520 may be coupled to one or more transmitting branches, one or more receiving branches, or a combination thereof, such that the radiating element 518 can transmit and receive signals RF2 via different wireless communication technologies operating in different frequency ranges and/or via different bands of a particular wireless communication technology. In one implementation, the feed 520 is coupled to a transmitting amplifier of a transmitting branch and in another implementation, the feed 520 is coupled to a receiving amplifier of a receiving branch, such that the second antenna structure 516 can transmit or receive signals via a respective feed line. Additionally, signals may be transmitted and received via the feed 520. The radiating element 518 also includes one or more shorts 506 that provide a connection between the radiating element 518 and ground. The one or more shorts 522 may provide some impedance tuning between the second antenna structure 516 and a transmitting amplifier and/or a receiving amplifier.

The second antenna structure 516 also includes a number of tuning elements. The tuning elements may be coupled to the second antenna structure 516 via a signal carrying line or the tuning elements may be directly coupled to the radiating element 518. In an illustrative implementation, the tuning element E 524 is coupled to the feed 520 and in series with a line carrying the signal RF2. In another illustrative implementation, the tuning element B 510 and the tuning element F 526 are coupled to the feed 520 and in parallel with a line carrying the signal RF2. In some implementations, the tuning element B 510 may include one or more parasitic elements, such as one or more passive radiating elements. Additionally, the tuning element G 528 and the tuning element H 530 are coupled directly to the radiating element 518. In some implementations, tuning element G 528 and the tuning element H 530 may be coupled to particular locations on the radiating element 518 to optimize the impedance matching performed by the respective tuning elements and to minimize any interference that the tuning elements 528, 530 may produce.

In an alternative implementation, one or both of the antenna structures 500, 518 could include two feeds similar to the antenna structure 400 of FIG. 4 and/or two radiating elements, such as the antenna structure 300 of FIG. 3. In addition, the antenna structures 500, 518 could be a same type of antenna or a different type of antenna. For example, the first antenna structure may be a PIFA, while the second antenna structure is a FICA.

Figure 6:
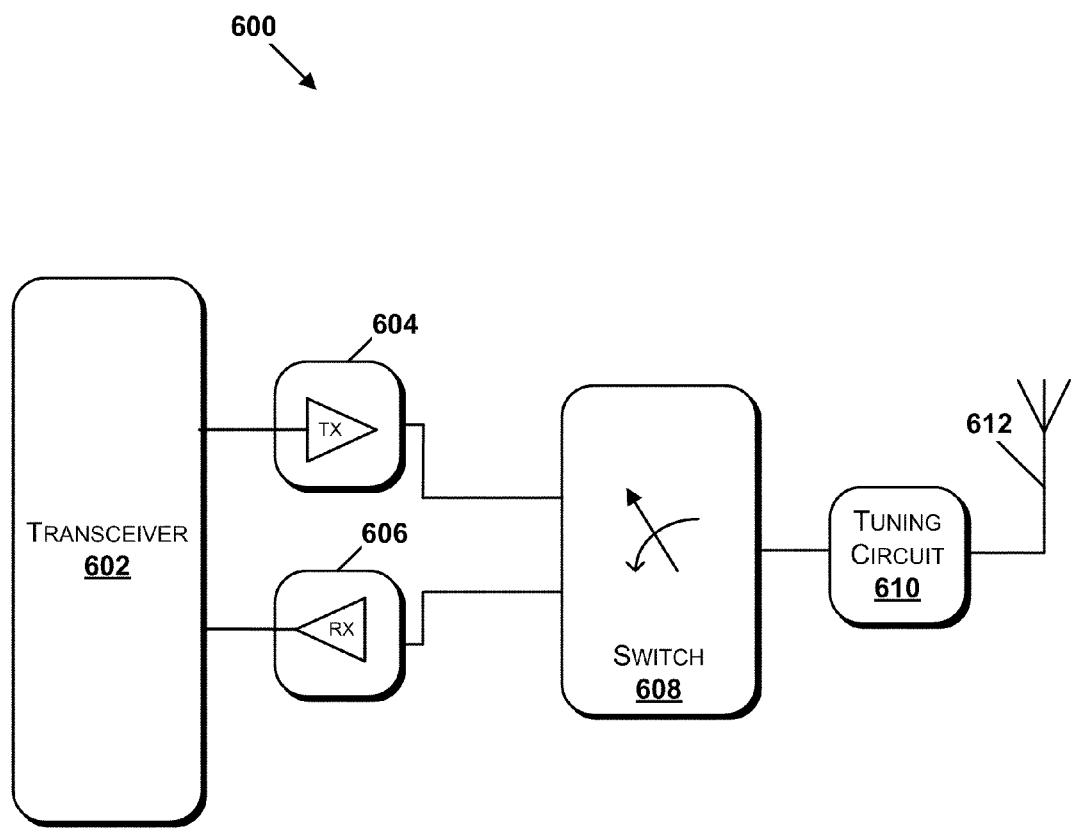
FIG. 6 shows a schematic circuit diagram of a first implementation of an exemplary architecture to provide impedance tuning of a small narrowband antenna utilizing a tuning circuit coupled to the small narrowband antenna.

FIG. 6 shows a schematic circuit diagram of a first implementation of an exemplary architecture to transmit and receive wireless signals via a narrowband antenna utilizing a tuning circuit coupled to the narrowband antenna. The architecture 600 may be included in the wireless communication device 102 shown in FIG. 1. Additionally, the architecture 600 may be utilized in a wireless communication device utilizing time division multiple access (TDMA) wireless communication technologies.

The architecture 600 includes a transceiver 602. The architecture 600 also includes a transmitting amplifier 604 and a receiving amplifier 606. In some implementations, the transmitting amplifier 604 may be a component of transmitter circuitry of the transceiver 602 and the receiving amplifier 606 may be a component of receiver circuitry of the transceiver 602. In other implementations, the transmitting amplifier 604 and the receiving amplifier 606 may be included in a transmitting branch, a receiving branch, or transmitting/receiving branch of a wireless communication device, such as the Tx/Rx branches 124 of FIG. 1. The transmitting amplifier 604 may be a power amplifier and the receiving amplifier 606 may be a low noise amplifier. The architecture 602 also includes a switch 608, such as a single pole double throw (SPDT) switch. The switch 608 allows signals to be provided by the transmitting amplifier 604 and received by the receiving amplifier 606 via a single antenna.

The architecture 600 also includes a tuning circuit 610 and a small narrowband antenna 612. The small narrowband antenna 612 may include tuning elements, such as the tuning elements 122 of the antenna(s) 120 of FIG. 1, the tuning elements 208-216 of FIG. 2, the tuning elements 308-318 of FIG. 3, the tuning elements 410-422 of FIG. 4, or the tuning elements 510-516 and 526-532 of FIG. 5.

A first node of the tuning circuit 610 is coupled to the switch 608 and a second node of the tuning circuit 610 is coupled to the narrowband antenna 612. In some implementations, the tuning circuit 610 may be included in the transceiver 602. The tuning circuit 610 matches an impedance of the narrowband antenna 612 with an impedance of the transmitting amplifier 604 and/or the receiving amplifier 606. In an illustrative implementation, the tuning circuit 610 receives a control signal indicating the impedance of the narrowband antenna 612 and the impedance of the transmitting amplifier 604 or the impedance of the receiving amplifier 606. In response to receiving the control signal, the tuning circuit 610 may change state to match the impedance of the narrowband antenna 612 with the impedance of the transmitting amplifier 604 or the impedance of the receiving amplifier 606. Thus, signals may be transferred between the narrowband antenna 612 and the transceiver 602 with maximum strength. In some implementations, the tuning circuit 610 may operate in conjunction with tuning elements of the narrowband antenna 612 to match the impedance of the narrowband antenna 612 with the impedance of the transmitting amplifier 604, the impedance of the receiving amplifier 606, or a combination thereof. In some instances, matching the impedance of the narrowband antenna 612 with the impedance of the transmitting amplifier 604 or the receiving amplifier 606 may involve matching the impedance of the narrowband antenna 612 with the impedance of the switch 608.

Figure 7:
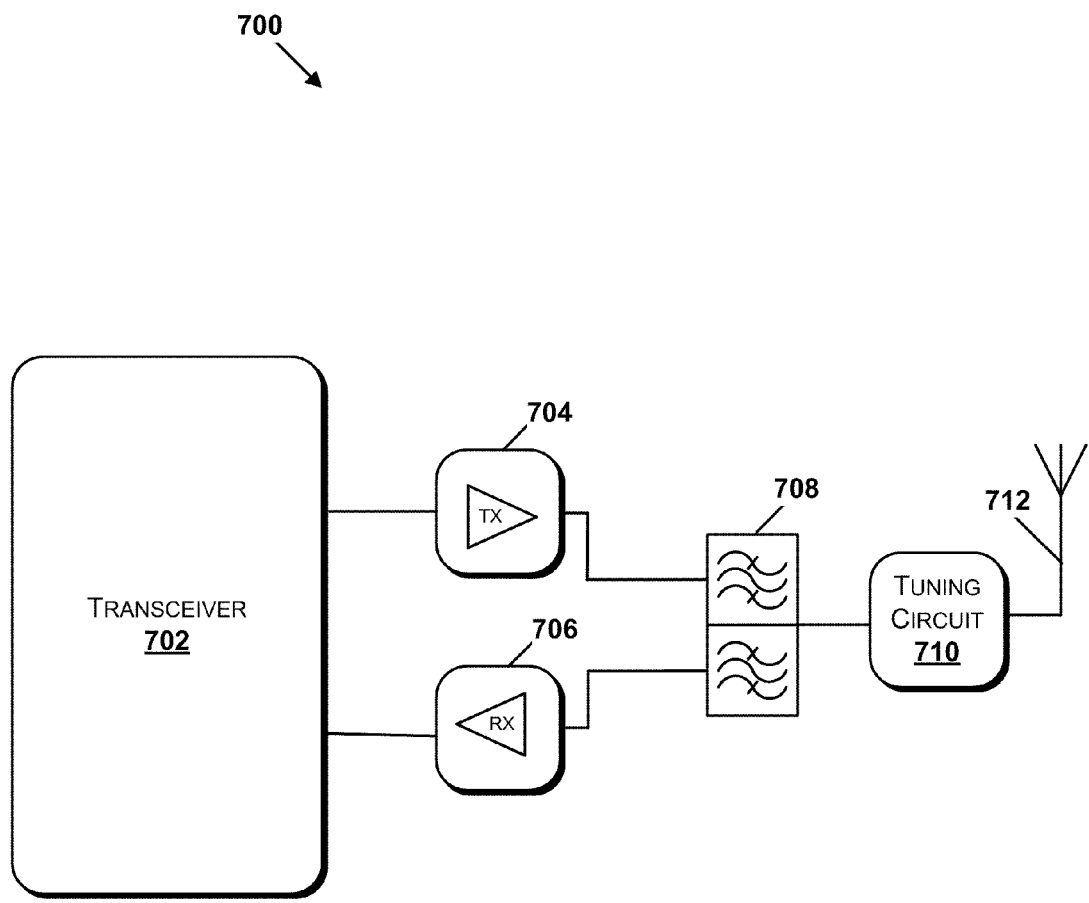
FIG. 7 shows a schematic circuit diagram of a second implementation of an exemplary architecture to provide impedance tuning of a small narrowband antenna utilizing a tuning circuit coupled to the small narrowband antenna.

FIG. 7 shows a schematic circuit diagram of a second implementation of an exemplary architecture to transmit and receive wireless signals via a narrowband antenna utilizing a tuning circuit coupled to the narrowband antenna. The architecture 700 may be included in the wireless communication device 102 shown in FIG. 1. Additionally, the architecture 700 may be utilized in a wireless communication device utilizing frequency division multiple access (FDMA) wireless communication technologies.

The architecture 700 includes a transceiver 702. The architecture 700 includes a transmitting amplifier 704 and a receiving amplifier 706. In some implementations, the transmitting amplifier 704 may be a component of transmitter circuitry of the transceiver 702 and the receiving amplifier 706 may be a component of receiver circuitry of the transceiver 702. In other implementations, the transmitting amplifier 704 and the receiving amplifier 706 may be included in a transmitting branch, a receiving branch, or a transmitting/receiving branch of a wireless communication device, such as the Tx/Rx branches 124 of FIG. 1. The transmitting amplifier 704 may be a power amplifier and the receiving amplifier 706 may be a low noise amplifier. The architecture 700 also includes a duplex filter 708. The duplex filter 708 allows signals to be provided by the transmitting amplifier 704 and received by the receiving amplifier 706 via a single antenna.

The architecture 700 also includes a tuning circuit 710 and a small narrowband antenna 712. The small narrowband antenna 712 may include tuning elements, such as the tuning elements 122 of the antenna(s) 120 of FIG. 1, the tuning elements 208-216 of FIG. 2, the tuning elements 308-318 of FIG. 3, the tuning elements 410-422 of FIG. 4, or the tuning elements 510-516 and 526-532 of FIG. 5.

A first node of the tuning circuit 710 is coupled to the duplex filter 708 and a second node of the tuning circuit 710 is coupled to the narrowband antenna 712. In some implementations, the tuning circuit 710 may be included in the transceiver 702. The tuning circuit 710 matches an impedance of the narrowband antenna 712 with an impedance of the transmitting amplifier 704 and/or the impedance of the receiving amplifier 706. In an illustrative implementation, the tuning circuit 710 receives a control signal indicating the impedance of the narrowband antenna 712 and the impedance of the transmitting amplifier 704 or the receiving amplifier 706. In response to receiving the control signal, the tuning circuit 710 may change state to match the impedance of the narrowband antenna 712 with the impedance of the transmitting amplifier 704 or the receiving amplifier 706. In some implementations, the tuning circuit 710 may operate in conjunction with tuning elements of the narrowband antenna 712 to match the impedance of the narrowband antenna 712 with the impedance of the transmitting amplifier 704, the impedance of the receiving amplifier 706, or a combination thereof. In some instances, matching the impedance of the narrowband antenna 712 with the impedance of the transmitting amplifier 704 or the receiving amplifier 706 may include matching the impedance of the narrowband antenna 712 with the impedance of the duplex filter 708.

Figure 8:
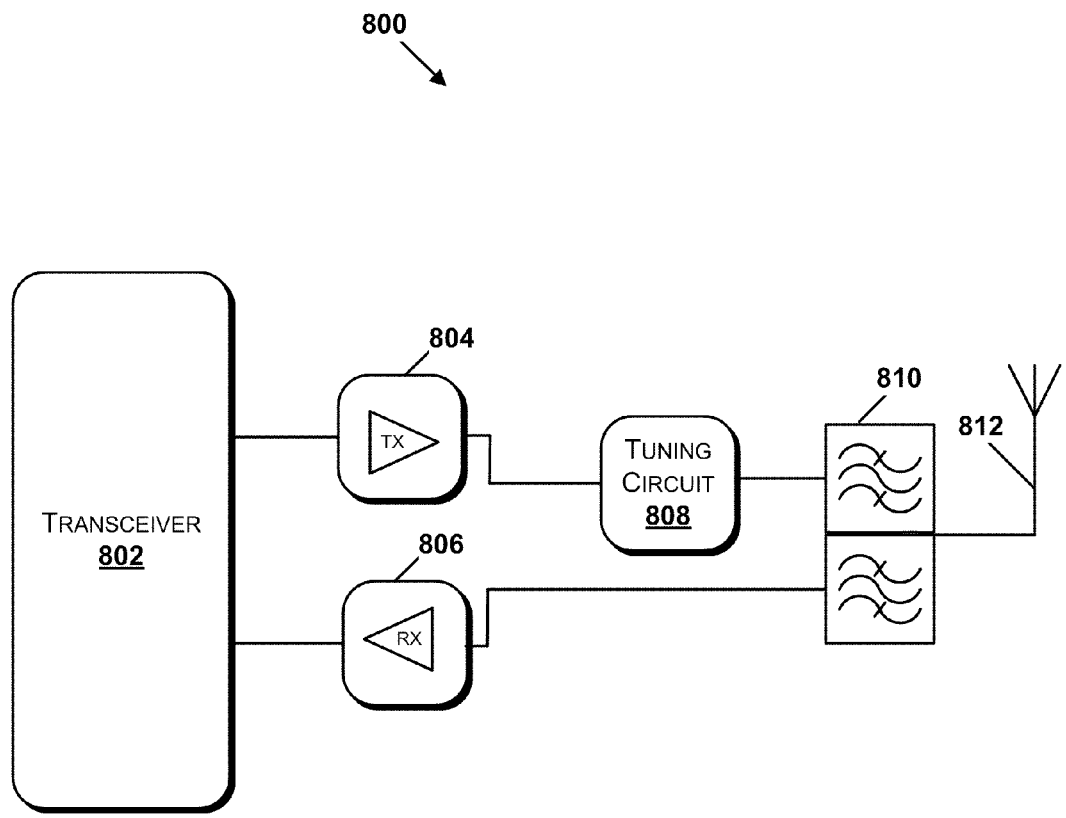
FIG. 8 shows a schematic circuit diagram of a third implementation of an exemplary architecture to provide impedance tuning of a small narrowband antenna utilizing a tuning circuit coupled to a transmitter device of a transceiver.

FIG. 8 shows a schematic circuit diagram of a third implementation of an exemplary architecture to transmit and receive wireless signals via a narrowband antenna utilizing a tuning circuit coupled to a transmitter device of a transceiver. The architecture 800 may be included in the wireless communication device 102 shown in FIG. 1. Additionally, the architecture 800 may be utilized in a wireless communication device utilizing frequency division multiple access (FDMA) wireless communication technologies.

The architecture 800 includes a transceiver 802. The architecture 800 includes a transmitting amplifier 804 and a receiving amplifier 806. In some implementations, the transmitting amplifier 804 may be a component of transmitter circuitry of the transceiver 802 and the receiving amplifier 806 may be a component of receiver circuitry of the transceiver 802. In other implementations, the transmitting amplifier 804 and the receiving amplifier 806 may be included in a transmitting branch, a receiving branch, or a transmitting/receiving branch of a wireless communication device, such as the Tx/Rx branches 124 of FIG. 1. The transmitting amplifier 804 may be a power amplifier and the receiving amplifier 806 may be a low noise amplifier. The architecture 800 also includes a tuning circuit 808. A first node of the tuning circuit 808 is coupled to the transmitting amplifier 804 and a second node of the tuning circuit 808 is coupled to a duplex filter 810. The duplex filter 810 is coupled to a small narrowband antenna 812. The small narrowband antenna 812 may include tuning elements, such as the tuning elements 122 of the antenna(s) 120 of FIG. 1, the tuning elements 208-214 of FIG. 2, the tuning elements 308-318 of FIG. 3, the tuning elements 410-422 of FIG. 4, or the tuning elements 510-516 and 526-532 of FIG. 5.

The tuning circuit 808 matches an impedance of the narrowband antenna 812 with an impedance of the transmitting amplifier 804. In an illustrative implementation, the tuning circuit 810 receives a control signal indicating the impedance of the narrowband antenna 812 and the impedance of the transmitting amplifier 804. In response to receiving the control signal, the tuning circuit 810 may change state to match the impedance of the narrowband antenna 812 with the impedance of the transmitting amplifier 804. Thus, signals may be transferred between the narrowband antenna 812 and the transceiver 802 with maximum strength. In some implementations, the tuning circuit 810 may operate in conjunction with tuning elements of the narrowband antenna 812 to match the impedance of the narrowband antenna 812 with the impedance of the transmitting amplifier 804. In some instances, matching the impedance of the transmitting amplifier 804 with the impedance of the narrowband antenna 812 may involve matching the impedance of the transmitting amplifier 804 with the impedance of the duplex filter 810.

The architecture 800 includes the tuning circuit 808 to match the impedance of the narrowband antenna 812 with the impedance of the transmitting amplifier 804, but does not include a tuning circuit to match the impedance of the narrowband antenna 812 with the impedance of the receiving amplifier 806 due to differing impedance matching requirements with respect to transmitting and receiving signals via the architecture 800. For example, the range of impedances of the narrowband antenna 812 with respect to the receiving amplifier 806 may be smaller than the range of impedances of the narrowband antenna 812 with respect to the transmitting amplifier 804. To illustrate, the narrowband antenna 812 may receive signals within a smaller range than the range of signals transmitted via the narrowband antenna 812. Thus, the narrowband antenna 812 may provide signals to the receiving amplifier 806 efficiently without impedance matching, while impedance matching is utilized to efficiently communicate signals from the transmitting amplifier 804 to the narrowband antenna 812. Additionally, although the architecture 800 is utilized with respect to FDMA wireless communication technologies, the architecture 800 may also be utilized with respect to TDMA wireless communication technologies by replacing the duplex filter 810 with a switch, such as an SPDT switch.

Figure 9:
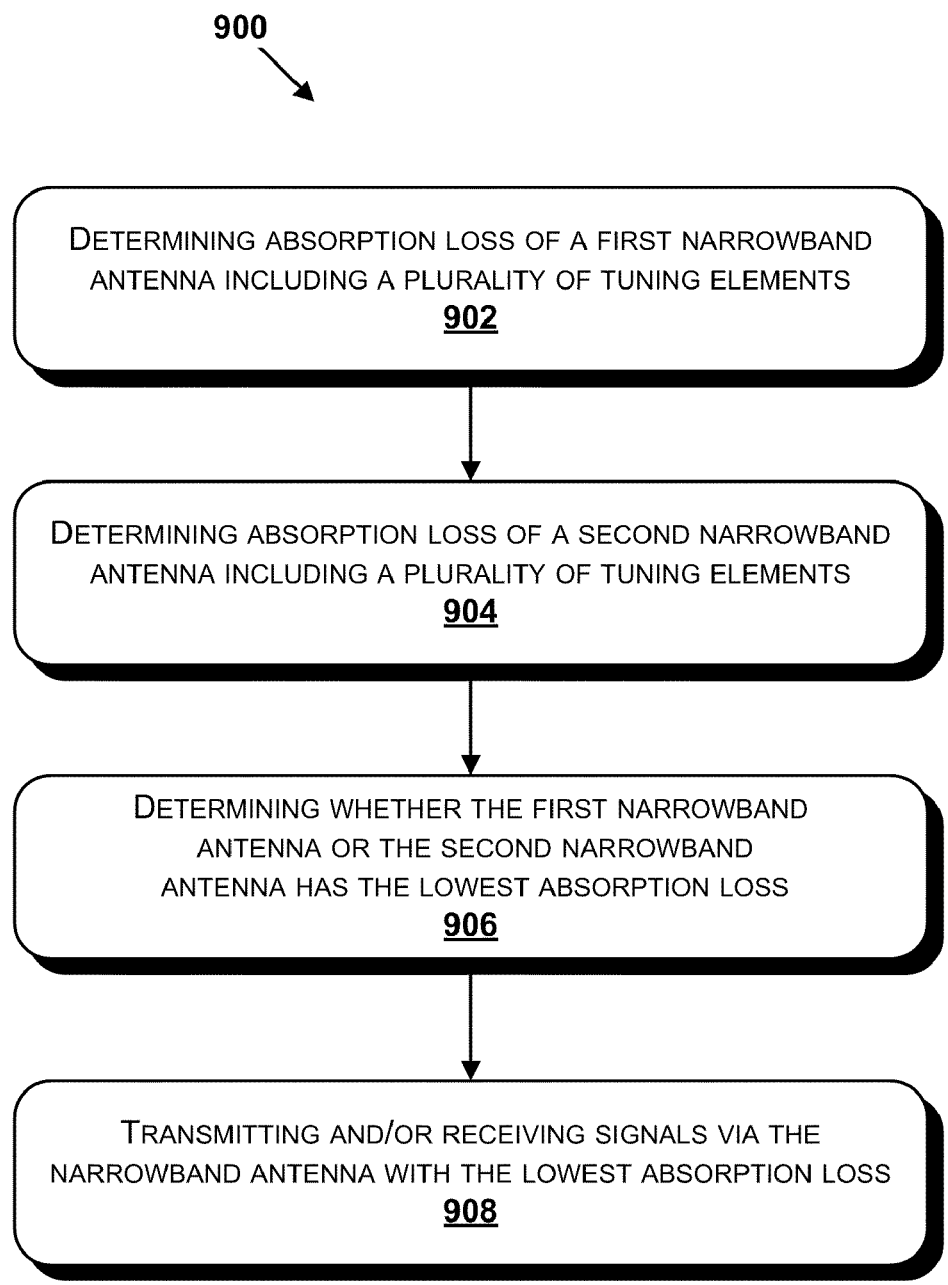
FIG. 9 shows a flowchart of a method to provide impedance tuning of a small narrowband antenna utilizing a tuning circuit.

FIG. 9 shows a flowchart of a method 900 to provide impedance tuning of a narrowband antenna utilizing a tuning circuit. The method 900 may be implemented utilizing the system 100 shown in FIG. 1, the antennas structure 200, 300, 400, 500 of FIGS. 2, 3, 4, and 5, respectively, and the architectures 600, 700, 800 shown in FIGS. 6, 7, and 8.

Specifics of an exemplary method are described below. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable storage media. The computer-readable storage media can be any available media that can be accessed by a computing device to implement the instructions stored thereon.

The method 900 begins at 902 with determining absorption loss of a first narrowband antenna of a wireless communication device, where the first narrowband antenna includes a number of tuning elements. The tuning elements match an impedance of the first narrowband antenna with an impedance of a transmitting amplifier and/or a receiving amplifier of the wireless communication device. At 904, absorption loss of a second narrowband antenna of the wireless communication device is determined. The second narrowband antenna also includes a plurality of tuning elements to match an impedance of the second narrowband antenna with the impedance of the transmitting amplifier and/or the receiving amplifier. At 906, a wireless communication device determines whether the first narrowband antenna or the second narrowband antenna has the lowest absorption loss.

The absorption loss of the first and second narrowband antennas may be caused by interaction of objects located proximate to the first narrowband antenna and the second narrowband antenna. For example, as a user of the wireless communication device holds the device in different ways, the absorption loss of the antennas may vary due to the interaction of a hand of the user with one or more of the antennas. To illustrate, a user of the wireless communication device may hold the device such that the first narrowband antenna is covered, while the second narrowband antenna is uncovered. In this illustration, the absorption loss of the second narrowband antenna would be less than the absorption loss of the first narrowband antenna. Other objects located proximate to the wireless communication device can also influence absorption loss, such as furniture, appliances, and/or building structures. In one implementation, a control unit of the wireless communication device determines the absorption loss of the first narrowband antenna and the second narrowband antenna.

At 908, signals are transmitted and/or received via the antenna with the lowest absorption loss. For example, when the absorption loss of the second narrowband antenna is less than the absorption loss of the first narrowband antenna, then the wireless communication device may transmit and receive signals via the second narrowband antenna. In another example, when the absorption loss of the first narrowband antenna is less than the absorption loss of the second narrowband antenna, then the wireless communication device may transmit and receive signals via the first narrowband antenna. In a particular implementation, a control unit of the wireless communication device directs the transceiver to transmit and/or receive signals via the narrowband antenna with the lowest absorption loss.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A wireless communication device comprising:
a transceiver;
a narrowband antenna decoupled from a chassis of the wireless communication device, the narrowband antenna including one or more tuning elements to match an impedance of a transmitting amplifier, the impedance of a receiving amplifier, or a combination thereof, with an impedance of the narrowband antenna, wherein the one or more tuning elements change a resonance frequency of the narrowband antenna; and
a control unit to determine an absorption loss of the narrowband antenna and instruct the transceiver to transmit signals via the narrowband antenna when the absorption loss is less than an absorption loss value.

2. The wireless communication device of claim 1, further comprising a tuning circuit, wherein a node of the tuning circuit is coupled to the narrowband antenna, and wherein the tuning circuit matches an impedance of the narrowband antenna with the impedance of the transmitting amplifier, the impedance of the receiving amplifier, or a combination thereof.

3. The wireless communication device of claim 2, further comprising a switch, wherein the node of the tuning circuit is a first node of the tuning circuit, and wherein a first node of the switch is coupled to a second node of the tuning circuit, a second node of the switch is coupled to the transmitting amplifier, and a third node of the switch is coupled to the receiving amplifier.

4. The wireless communication device of claim 2, further comprising a duplex filter, wherein the node of the tuning circuit is a first node of the tuning circuit, and wherein a first node of the duplex filter is coupled to a second node of the tuning circuit, a second node of the duplex filter is coupled to the transmitting amplifier, and a third node of the duplex filter is coupled to the receiving amplifier.

5. The wireless communication device of claim 1, wherein the tuning elements include one or more radio frequency switches.

6. The wireless communication device of claim 1, wherein the tuning elements include one or more tunable capacitors.

7. The wireless communication device of claim 1, further comprising an additional narrowband antenna including one or more tuning elements to change a resonance frequency of the additional narrowband antenna, and wherein the absorption loss value is associated with the additional narrowband antenna.

8. The wireless communication device of claim 7, wherein the narrowband antenna includes a plurality of radiating elements.

9. A device comprising:
a transceiver;
a first narrowband antenna;
a second narrowband antenna; and
a control unit to determine an absorption loss of the first narrowband antenna and determine an absorption loss of the second narrowband antenna, the control unit further to select the first narrowband antenna or the second narrowband antenna based on the determining of the absorption losses associated with the respective first and second narrowband antennas.

10. The device of claim 9, wherein the control unit instructs the transceiver to transmit signals via the first narrowband antenna when the absorption loss of the second narrowband antenna is greater than the absorption loss of the first narrowband antenna.

11. The device of claim 9, wherein the control unit instructs the transceiver to transmit signals via the second narrowband antenna when the absorption loss of the second narrowband antenna is less than the absorption loss of the first narrowband antenna.

12. The device of claim 9, further comprising one or more tuning elements coupled directly between a radiating element of the first or second narrowband antenna and ground.

13. The device of claim 9, further comprising one or more tuning elements coupled between two points of a radiating element of the first or second narrowband antenna.

14. The device of claim 9, wherein the first or second narrowband antenna includes two feed points and a tuning element is coupled between the two feed points.

15. A method comprising:
determining, by a wireless communication device, absorption loss of a first narrowband antenna, the first narrowband antenna including a plurality of tuning elements to match an impedance of the first narrowband antenna with an impedance of a transmitting amplifier of the wireless communication device, an impedance of a receiving amplifier of the wireless communication device, or a combination thereof;
determining, by the wireless communication device, absorption loss of a second narrowband antenna, the second narrowband antenna including a plurality of tuning elements to match an impedance of the second narrowband antenna with an impedance of the transmitting amplifier, the impedance of the receiving amplifier, or a combination thereof;
determining, by the wireless communication device, whether the absorption loss of the second narrowband antenna is greater than the absorption loss of the first narrowband antenna;
transmitting signals, by the wireless communication device, via the first narrowband antenna when the absorption loss of the second narrowband antenna is greater than the absorption loss of the first narrowband antenna; and
transmitting signals, by the wireless communication device, via the second narrowband antenna when the absorption loss of the second narrowband antenna is less than the absorption loss of the second narrowband antenna.

16. The method of claim 15, wherein interaction of objects located proximate to the wireless communication device with the first narrowband antenna contributes to the absorption loss of the first narrowband antenna.

17. The method of claim 15, further comprising:
receiving signals, by the wireless communication device, via the first narrowband antenna when the absorption loss of the second narrowband antenna is greater than the absorption loss of the first narrowband antenna; and
receiving signals, by the wireless communication device, via the second narrowband antenna when the absorption loss of the second narrowband antenna is less than the absorption loss of the second narrowband antenna.

18. The method of claim 15, wherein a control unit of the wireless communication device determines the absorption loss of the first narrowband antenna and the absorption loss of the second narrowband antenna.

19. The method of claim 18, wherein the control unit directs a transceiver of the wireless communication device to transmit signals via the first narrowband antenna or the second narrowband antenna.

* * * * *